(12) United States Patent
Bytzek et al.

(10) Patent No.: US 10,112,457 B2
(45) Date of Patent: Oct. 30, 2018

(54) METHOD FOR PRODUCING A VEHICLE HEATER AND VEHICLE HEATER

(71) Applicant: WEBASTO SE, Stockdorf (DE)

(72) Inventors: Dietmar Bytzek, Germersheim (DE); Thorsten Kabelitz, Munich (DE); Karl Goettl, Rosenheim (DE); Daniel Eckert, Stockdorf (DE)

(73) Assignee: Webasto SE, Stockdorf (DE)

( * ) Notice: Subject to any disclaimer, the term of this patent is extended or adjusted under 35 U.S.C. 154(b) by 891 days.

(21) Appl. No.: 14/379,080

(22) PCT Filed: Feb. 8, 2013

(86) PCT No.: PCT/EP2013/052600
§ 371 (c)(1),
(2) Date: Aug. 15, 2014

(87) PCT Pub. No.: WO2013/120786
PCT Pub. Date: Aug. 22, 2013

(65) Prior Publication Data
US 2015/0014424 A1 Jan. 15, 2015

(30) Foreign Application Priority Data
Feb. 16, 2012 (DE) .................. 10 2012 202 370

(51) Int. Cl.
*B60H 1/22* (2006.01)
*G01K 13/00* (2006.01)
(Continued)

(52) U.S. Cl.
CPC ........... *B60H 1/2215* (2013.01); *G01K 13/00* (2013.01); *H05B 1/0236* (2013.01); *H05B 3/262* (2013.01);
(Continued)

(58) Field of Classification Search
CPC .......... B60H 1/2215; B60H 2001/2246; B60H 1/00271; B60H 2001/00128; G01K 13/00;
(Continued)

(56) References Cited

U.S. PATENT DOCUMENTS 4,149,066 A 4/1979 Niibe
6,524,697 B1 * 2/2003 Furuyama ................ G01K 7/16
252/512

(Continued)

FOREIGN PATENT DOCUMENTS

CN 102067719 A 5/2011
GB 2477337 A 8/2011
(Continued)

OTHER PUBLICATIONS

International Search Report dated May 7, 2013 in connection with PCT/EP2013/052600.

*Primary Examiner* — Gregory Huson
*Assistant Examiner* — Daniel E Namay
(74) *Attorney, Agent, or Firm* — Quarles & Brady LLP

(57) ABSTRACT

In a method for producing a vehicle heater (10), a main body (12) of the vehicle heater (10) is equipped with a non-intrinsically safe heat conductor layer (14), and a sensor device (16, 18, 20) for detecting exceedances of a temperature threshold value. To form the sensor device (16, 18, 20) a sensor layer (16) is sprayed on without the main body (12) being exposed to temperatures normal for baking processes. A vehicle heater (10) is equipped with a main body (12) carrying a non-intrinsically safe heat conductor layer (14), and with a sensor device (16, 18, 20) allocated to the heat conductor layer (14) and provided to detect the exceedance of a temperature threshold value. The sensor device (16, 18,

(Continued)

20) comprises a sprayed-on sensor layer (16) produced without the main body (12) assuming temperatures that are normal for baking processes.

11 Claims, 2 Drawing Sheets

(51) Int. Cl.
    *H05B 1/02*         (2006.01)
    *H05B 3/26*         (2006.01)
(52) U.S. Cl.
    CPC ............ *B60H 2001/2246* (2013.01); *H05B 2203/003* (2013.01); *H05B 2203/013* (2013.01); *H05B 2203/017* (2013.01); *H05B 2203/023* (2013.01)
(58) Field of Classification Search
    CPC ............ H05B 1/0236; H05B 3/262; H05B 2203/013; H05B 2203/017; H05B 2203/023
    USPC ........................................... 237/28
    See application file for complete search history.

(56) References Cited

U.S. PATENT DOCUMENTS

| | | | | |
|---|---|---|---|---|
| 7,097,875 | B2* | 8/2006 | Clyde | G01N 27/4075 427/115 |
| 8,505,928 | B2* | 8/2013 | Saito | H01L 21/67103 156/345.52 |
| 8,829,397 | B2* | 9/2014 | Kano | H01L 21/67103 118/725 |
| 2003/0008400 | A1* | 1/2003 | Putnam | G01N 31/225 436/1 |
| 2003/0047452 | A1* | 3/2003 | Jain | G01N 27/4071 204/421 |
| 2003/0057109 | A1* | 3/2003 | Wang | G01N 27/4072 205/775 |
| 2003/0075440 | A1* | 4/2003 | Jain | G01N 27/4071 204/421 |
| 2004/0094416 | A1* | 5/2004 | Chen | G01N 27/419 204/426 |
| 2004/0117974 | A1* | 6/2004 | Clyde | G01N 27/4075 29/592.1 |
| 2004/0217098 | A1* | 11/2004 | Polikarpus | G01N 27/4062 219/209 |
| 2004/0226832 | A1* | 11/2004 | Jain | G01N 27/407 205/784 |
| 2006/0016687 | A1* | 1/2006 | Wallace | G01N 27/4071 204/515 |
| 2006/0024427 | A1* | 2/2006 | Clyde | G01N 27/4071 427/58 |
| 2006/0237316 | A1* | 10/2006 | Clyde | G01N 27/4075 204/424 |
| 2008/0185454 | A1* | 8/2008 | Vontell | F01D 9/041 237/28 |
| 2009/0272731 | A1 | 11/2009 | Olding | |
| 2011/0142091 | A1* | 6/2011 | Wardle | B82Y 15/00 374/45 |
| 2011/0233546 | A1* | 9/2011 | Higashi | G01K 13/00 257/48 |
| 2012/0072157 | A1* | 3/2012 | Alameh | G01K 13/00 702/99 |
| 2012/0217232 | A1* | 8/2012 | Hermann | B60H 1/2215 219/202 |
| 2013/0264203 | A1* | 10/2013 | Gamboa | H05B 3/12 204/424 |
| 2013/0298648 | A1* | 11/2013 | Sun | A61B 5/14532 73/61.76 |
| 2014/0070054 | A1* | 3/2014 | Burton | B64D 15/12 244/134 D |

FOREIGN PATENT DOCUMENTS

| | | |
|---|---|---|
| JP | H05507988 A | 11/1993 |
| JP | H05322818 A | 12/1993 |
| JP | 2011236774 A | 11/2011 |
| KR | 1020060121638 A | 11/2006 |
| WO | 2007029981 A1 | 3/2007 |
| WO | 2011047471 A1 | 4/2011 |

* cited by examiner

METHOD FOR PRODUCING A VEHICLE HEATER AND VEHICLE HEATER

CROSS-REFERENCE TO RELATED APPLICATIONS

This application represents the national stage entry of PCT International Application No. PCT/EP2013/052600 filed Feb. 8, 2013 which claims the benefit of German Patent Application 10 2012 202 370.4 filed Feb. 16, 2012, both of which are hereby incorporated herein by reference for all purposes.

The invention relates to a method for producing a vehicle heater in which a main body of the vehicle heater is equipped with a non-intrinsically safe heat conductor layer and a sensor device for detecting exceedances of a temperature threshold value.

The invention further relates to a vehicle heater, particularly a vehicle heater produced using the method described here, comprising a main body carrying a non-intrinsically safe heat conductor layer, and a sensor device allocated to the heat conductor layer which is provided to detect an exceedance of a temperature threshold value.

The main body may, for example, be a heat exchanger in both cases, particularly a metal/air and/or a metal/liquid heat exchanger.

In contrast to intrinsically safe heat conductor layers, for example PTC heat conductor layers, which can independently prevent an excessive increase of the temperature by limiting the current flow all types of heat conductor layers not having precisely this capability of avoiding unsafe conditions in case of a defect are meant with non-intrinsically safe heat conductor layers here.

The non-intrinsically safe heat conductor layer may, without being limited thereto, for example be provided to be supplied with comparably high voltages (for example 250 volt), wherein excessively high voltages may, for example, be clocked down by pulse width modulation if this seems advantageous. Such, as compared to conventional on-board networks of 12 or 24 volts, relatively high voltages are often available anyway, for example in electric or hybrid vehicles. In such environments, for example, electric vehicle heaters having a capacity in the range of three to eight kilowatts can definitely be operated, wherein the field of application of the invention is by no means limited to this output range or these vehicle types.

A vehicle heater comprising a heat conductor layer in the form of a non-intrinsically safe heating element is, for example, known from the patent specification EP 1 361 089 B1. According to this publication, three alternative sensors for the surface-specific detection of a heat radiation representing the heating element are provided for monitoring the temperature, wherein the heating element is formed as a meander-shaped corrugated rib. One of these sensors is designed as a contact-free infrared sensor. Another sensor contacting the heating element is provided in the form of an electric resistance line integrated in the heating element. The third sensor suggested there is also disposed in the area of the heating element or integrated in the same and operates on the basis of a temperature sensitive optic fibre. One disadvantage of the two sensors disposed in the area of the heating element is that both the subsequent integration of the resistance line and the subsequent integration of the optic fibre are labour-intensive and thus cost intensive, leaving aside the fact that these separate components themselves are comparatively expensive.

From other fields of the art it is known to provide sensor layers on main bodies for detecting exceedances of a temperature threshold value as an alternative to the use of separate components, wherein the sensor layers are directly formed on the main body or on materials already carried by it using appropriate baking processes. To this end at least the main body and the sensor material to be burned in have to be exposed to temperatures of typically 900° C. or more, for example for a period of 10 to 30 minutes. The material usable for the main body and/or the material which can already be applied to the main body before the baking process, if required, is/are therefore subject to limitations with regard to the temperature tolerance.

It is the object of the invention to describe, based on the generic method for producing vehicle heaters and on the generic vehicle heaters, a solution for cost-efficient sensor layers for detecting exceedances of a temperature threshold value in which the main body is subject to the minimum possible limitations with regard to its temperature tolerance.

This object is solved by the features of the independent claims. Advantageous embodiments and further developments of the invention emerge from the dependent claims.

What is suggested is, first, a method for producing a vehicle heater in which a main body of the vehicle heater is equipped with a non-intrinsically safe heat conductor layer and a sensor device for detecting exceedances of a temperature threshold value. For forming the sensor device a sensor layer is sprayed on without the main body being exposed to the temperatures common in baking processes. Such spraying on of sensor layers can be implemented at low costs comparable to those of a baking method, however, it limits the requirements on the temperature tolerance of the used main body (or to the materials already carried by the main body) considerably less. As a result of the use of a spraying method, therefore, also materials are contemplable for the main body which would melt or be otherwise negatively affected in their material properties with regard to the intended use at the temperatures common in baking processes. For example, the main body may, as a result of the use of a suitable spraying method, fully or partly consist of aluminium. Of course also a multitude of other materials are contemplable for the main body, these being materials having good heat conducting properties in many cases. Only by way of example, aluminium alloys, glasses and ceramics are to be mentioned in this connection. If the sensor layer is, as preferably intended, disposed on the side of the heat conductor layer which is far to the main body specific advantages emerge. For example, in many cases, an improved heat conduction between the heat conductor layer and the main body can be ensured in this way. Apart from this, the sensor layer can, in this way, also detect the temperature of the heat conductor layer more precisely than in embodiments in which the sensor layer is disposed between the main body acting as a heat sink and the heat conductor layer.

For spraying on the sensor layer, particularly thermal spraying methods are contemplable, for example, a plasma spraying method, a cold gas spraying method or a flame spraying method. In some cases it may be advantageous to also form other components of the vehicle heater, for example the heat conductor layer, using a thermal spraying method. Cold gas plasma spraying methods and suspension flame spraying methods are presently considered particular suitable thermal spraying methods. In cold gas spraying a gas, for example nitrogen, is accelerated to high speeds, particles transported in the gas impacting on the main body or a substrate carried by it at high speeds (for example a multiple of the speed of sound) and forming a dense, tightly adhering layer due to the high kinetic energy. In suspension flame spraying first a suspension containing the particles to be sprayed on is prepared to then inject this suspension into a flame. In the process the liquid will, at least partly, however, preferably completely, evaporate, and (ideally) only the respective particles impinge on the target surface so that dense layers can be produced. In any case it is common to the contemplable methods for spraying on the sensor layer that the main body does not have to be exposed to the high temperatures common in baking methods in the process.

In this connection it may, for example, be contemplated that the main body is only exposed to temperatures of less than 800° C., less than 650° C. and even less than 500° C. It is comprehensible that the number of materials usable for the main body (and/or any other components already carried by it) will increase the lower the temperatures can be kept. In this context it should be clear that the wording "is exposed to temperatures" does not necessarily mean that the entire main body is to or has to thereby assume this temperature. It is rather exclusively relevant that the main body is, not even in sections, exposed to temperatures which might cause damage to it. Depending on the nature of the main body (size, heat conductivity, etc.) it may therefore definitely be possible in some cases that the main body, for example, already carries components (for example electric or other components) which can only withstand much lower temperatures than 500° C., for example only 100° C. or even less, in the areas not directly exposed to the spraying process.

The sensor layer may have a layer thickness in the range of 10 μm to 200 μm. However, also layer thicknesses in the range of 10 μm to 100 μm or only 10 μm to 50 μm are contemplable. The term sensor layer is not only to include homogenous sensor layers here and in other places, but definitely also multi-layered sensor layer structures. For example, the sensor layer may, depending on the application, comprise one or more insulating layers and/or one or more contact layers and/or one or more layers of which a change of electric, optic or other properties can be made use of to detect exceedances of temperature threshold values. Further, the structure and the thickness of the sensor layer do not have to be identical in all sections. If a sensor layer is, for example, monitored for current flows occurring in its longitudinal direction it may be sufficient to, in relation to the longitudinal direction, only provide the end sections with contact areas. If, however, for example a planar sensor layer is to be monitored for current flows extending substantially in the direction of its surface normal it will generally be reasonable to provide two spaced-apart planar electrodes or contact layers extending substantially perpendicular to the surface normal. A person skilled in the art will select the layout and the thickness of the sensor layer depending on the application, for example so that a sufficiently reliably detectable electric (or optic or other) effect occurs in case of an exceedance of a temperature threshold value and that the material usage is yet kept as low as possible.

It may be contemplated that the sensor layer is produced with the aid of a powder, wherein powder particles of the powder are present in an agglomerated form or are brought in an agglomerated form, and wherein the non-agglomerated powder particles have a mean grain size d50 of less than 20 μm, preferably less than 10 μm. With regard to the accepted definition of the average grain size d50 meant here reference is made to the applicable ISO 9276-2, should there be any need for an explanation in this respect. For example, barium titanate powder which may, in some cases, be contemplable for producing the sensor layer typically has a crystal size of less than 10 μm (for example from 2 μm to 8 μm or from 4 μm to 5 μm). This particle size may be too small for some thermal spraying methods (such as, for example, plasma spraying methods) since it may lead to a clogging of openings of the spraying gun used in these methods (or any other component of the device used for spraying). However, if a plurality of powder particles is present in an agglomerated form, for example embedded in a shell material, clogging of the openings of the spraying gun can be avoided. In the agglomerates, a plurality of powder particles may respectively be connected to the shell material which may, for example, comprise a plastic material such as polyvinyl alcohol as a component. Since at least the vast majority of the agglomerates is larger than individual powder particles clogging of the spraying gun (or any other component of the device used for spraying) can be avoided in this way, at least in many cases. Of course the production and use of agglomerates is not limited to barium titanate powder. Rather, this technique can be used for any powder having excessively small powder particles which is contemplable within the scope of the invention. For the sprayed-on sensor layer to altogether have the desired electric (or optic or other) properties it may be reasonable to appropriately condition the shell material used for forming the agglomerates. If, for example, altogether a particular, specific electric conductivity is to be obtained the shell material should preferably have a specific electric conductivity which is about at least as high as the specific electric conductivity of the powder particles (at a normal operating temperature of the vehicle heater) if the agglomerates are not destroyed in the process of spraying or the shell material at least partly remains a component of the sprayed-on sensor layer. The destruction of the agglomerates or an at least partial removal of the shell material may, however, also be intentionally supported so that the properties of the sensor layer are (at least to a large extent) determined by the property of the powder particles. To this end suitable thermal, chemical and/or physical processes or subsequent treatment steps can be carried out as soon as the agglomerates have passed the sections tending to get clogged. If first a plurality of powder grains is to be brought in the agglomerated form, for example the following approach is contemplable: In a first step, the associated material may be provided in its original condition. In a second step then a conversion into a solid material may be implemented, particularly by means of sintering. Then the solid material is pulverised by crushing the solid material. Following this the powder particles may be agglomerated by using a binder system as well as a subsequent drying and burning out of the binder. It is also possible to pulverise the powder particles with the aid of a granulating method. If, for example, granulated perovskite powder having a predetermined average grain size d50 is to be used the following approach is contemplable: In a first process stage, weighting and mixing, solving of the salts in acid, precipitating in an alkaline solution, filtering as well as rinsing and drying are performed. In a second process stage then a heat treatment for a phase reaction and/or conversion can be carried out. In a third process stage then wet grinding to the desired grain size can be performed, wherein in a fourth process stage fractioning by screening or sieving, a control of the finished powder material and/or processing of residual amounts may be performed.

In specific embodiments of the method described here it may be contemplated that the sensor layer is produced with the aid of a powder which leads to a resistance or impedance characteristic including a positive temperature coefficient.

This approach is particularly reasonable if the sensor layer has an elongated extension with two end sections between which a measurement signal is picked up to monitor the sensor layer with regard to currents occurring in its longitudinal direction (or forced currents). The mode of operation may then be similar to the use of a PTC resistance conductor because, due to the series connection character of such an elongated extension already a sufficient heating of a comparably short longitudinal section is enough to increase the overall resistance (or the overall impedance) so that a local exceedance of a temperature threshold value can be reliably be detected. Exceedances of the temperature threshold value occurring along larger longitudinal sections or even across the entire length can, of course, all the more be reliably detected in this way. An example for attaining a resistance characteristic with a positive temperature coefficient is the use of the already above mentioned barium titanate-powder, wherein the relatively cost-effective barium titanate is preferably doped with lead.

Further, embodiments are feasible in which it is contemplated that the sensor layer is produced with the aid of a powder which leads to a resistance or impedance characteristic involving a negative temperature coefficient. The provision of a negative temperature coefficient is particularly contemplable if the sensor layer is, in the broadest sense, an, at least in sections, planar layer which is to be monitored for current flows in the direction of its (potentially respective) surface normal. A planar sensor layer is to be understood to also include, for example, a sensor layer composed of one or more (possibly extremely narrow) strips here, for example, also a layer composed of strips in which the strip is wound around a cylinder surface several times and on different levels so that a multitude (differential) surface normals emerges. Generally the upper and the lower side of the layer having a negative temperature coefficient are respectively equipped with a likewise planar electrode for picking up a measurement signal. Such a sensor layer may be regarded as a parallel connection of a plurality of resistors or impedances (capacities) so that even a local exceedance of a temperature threshold value leads to a reliably detectable decrease of the overall resistance (or the overall impedance). Exceedances of the temperature threshold value affecting larger surface sections or even the entire surface can, of course, also be reliably detected in this way. Likewise, for example, also a local flashover or a local electric arc formation between the electrodes can be detected or, in the ideal case, be predicted and thus avoided. For example in cases in which exclusively the detection of flashovers is relevant also embodiments are contemplable in which the sensor layer is formed by a planar insulator layer comprising contact layers provided on its upper and lower side. Insofar the term negative temperature coefficient is to be understood in the broadest sense here. To form a sensor layer having a negative temperature coefficient in the classical sense, for example, materials such as silicon dioxide, silicon carbide, aluminium oxide, titanium oxide and other ceramic materials may be used. In case of a glass ceramic it may, for example, be contemplated that it contains one or more alkali metals, for example in a proportion of up to ten weight percent. It may also be contemplated that the glass ceramic is doped with zirconium oxide, zirconium silicate, quartz, titanium oxide and/or zinc oxide. The proportion of the doping may, for example, amount to up to three weight percent in this case.

Any vehicle heater produced with the aid of a variant of the method described above is included in the scope of protection of the associated claims.

Further, a vehicle heater is suggested, particularly a vehicle heater produced with the aid of the method described above. The vehicle heater comprises a main body carrying a non-intrinsically safe heat conductor layer, and a sensor device allocated to the heat conductor layer and provided to detect an exceedance of a temperature threshold value. The sensor device comprises a sprayed-on sensor layer produced without the main body assuming temperatures common in baking processes. Such vehicle heaters can, for example, be identified by the main body carrying the sensor layer consisting of a material which would have melted or have been otherwise changed in a negative way at temperatures common in baking processes. For example, aluminium cannot withstand the 900° C. or more commonly required for baking processes without melting (at least partly). Furthermore, there are generally no glassed areas in layers produced by thermal spraying methods while they can often be found on layers produced by baking methods.

The main body may also be a heat exchanger or a heat exchanger component in case of the vehicle heater, for example a metal/air and/or a metal/liquid heat exchanger.

Apart from this, the advantages and features explained above in connection with the production method emerge analogously or similarly for the vehicle heater in question here. Therefore, for omitting repetitions, reference is made to the associated explanations in this place. It is expressly emphasised that all features discussed in connection with the production method may be important individually or in any combination and analogously for the vehicle heater even if these features were not claimed within the scope of the vehicle heater to date.

From the above it becomes clear that a basic idea of the invention resides in the production of cost-effective electric vehicle heaters, particularly electric vehicle heaters having comparably high operating voltages of, for example, some hundred volts direct voltage without using baking methods by applying at least the sensor layer for detecting exceedances of a temperature threshold value allocated to the heat conductor layer, preferably, however, all layers of the layered structure to the main body using thermal spraying methods. In this way the main body is exposed to significantly lower temperatures than in the commonly used baking methods so that, for example, also materials having a comparably low melting point are contemplable for the main body. In cases in which the initial powder used for producing the respective layer, for example barium titanate powder, has such a small mean grain size d50 that clogging of the devices used for the thermal spraying has to be apprehended it is contemplated to agglomerate a plurality of powder grains prior to the thermal spraying to reduce the risk of clogging. To this end, the powder grains to be agglomerated can be enclosed by a shell material. The shell material may either be removed again (at least to the extent possible) after having passed the sections tending to clog, or purposefully remain in the produced layer as a component, in which case the material properties of the shell material have to be selected so that they match the properties of the layer to be produced. For the sensor layers provided for detecting exceedances of the temperature threshold value both materials having a positive and materials having a negative temperature coefficient are contemplable. All in all, therefore, for example a vehicle heater comprising an aluminium heat exchanger carrying a non-intrinsically safe heat conductor layer can be produced which is monitored for exceedances of the temperature threshold value by a sensor device.

The invention will now be explained by way of example with the aid of particularly preferred embodiments with reference to the accompanying drawings in which:

In the Figures the same numerals designate identical or similar components which will, at least partly, not be explained more than once for avoiding repetitions.

FIG. 1 shows a schematic, partly perspective representation of a first embodiment of a vehicle heater 10, and it illustrates, at the same time, process steps for producing this vehicle heater 10.

The vehicle heater 10 shown in FIG. 1 as well as all of the vehicle heaters described below may either be air heaters or so-called water heaters, for example—and without being limited thereto—for electric or hybrid cars. Air heaters differ from so-called water heaters in that in air heaters the air flow to be heated is directly guided over a heat exchanger of the air heating device, while in the so-called water heaters first a liquid, generally a mixture of water—therefore the name—and a frost protection agent, for example glycol, is guided over a heat exchanger of the water heating device to transport the heat to the desired location with the aid the liquid and of another heat exchanger.

Figure 1:
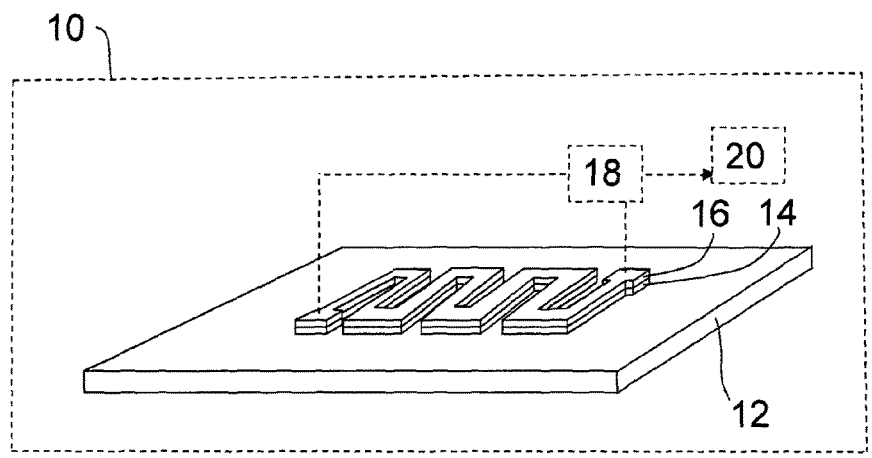
FIG. 1 shows a schematic, partly perspective representation of a first embodiment of a vehicle heater which, at the same time, illustrates process steps for producing this vehicle heater.

The vehicle heater 10, as a whole only schematically shown as a block in FIG. 1, comprises a main body 12 which, in this case, is a heat exchanger. Depending on the type of vehicle heater this heat exchanger 12 is provided for heating air or a liquid for which purpose the heat exchanger 12 may comprise ribs or similar means (not shown) for enlarging the surface effective for the heat exchange at its bottom side. When producing the vehicle heater 10 shown in FIG. 1 the surface of the heat exchanger 12 was equipped with a non-intrinsically safe heat conductor layer 14, namely with the aid of a thermal spraying method. The direct application of the heat conductor layer 14 onto the heat exchanger 12, i.e., the omission of an intermediate insulation layer, is, as a general rule, only reasonable if the heat exchanger 12 is made of a material having a distinctly lower electric conductivity than the heat conductor layer 14. In operation, the heat conductor layer 14 is connected to a voltage source (not shown) which may, for example, be a direct voltage source also clocked down to 250 volts by pulse width modulation, if required. To this end, the heat conductor layer 14 is to be suitably connected at its end sections (with regard to its elongated extension direction) which is at the discretion of the person skilled in the art and is likewise not shown.

With the aid of a thermal spraying method, a sensor layer 16 having, in the embodiment according to FIG. 1, a positive temperature coefficient was sprayed onto the heat conductor layer 14 so that for the sensor layer 16, at least by tendency, a PTC characteristic emerges.

In practice, the use of a thermal spraying method may possibly result in a configuration in which, instead of the schematically shown precise, sandwich-like layer structure, the material of the sensor layer 16, at least in sections, also extends over the edge sections of the heat conductor layer 14 or in which the heat conductor layer 14 is even more or less completely buried under the sensor layer 16.

If the sensor layer 16 is, without the use of an insulation layer, directly positioned on the heat conductor layer 14 as shown in FIG. 1 the electric conductivity of the sensor layer 16 has to be selected so that it is (distinctly) lower than the electric conductivity of the heat conductor layer 14 at normal operating temperatures to ensure a proper operation of the vehicle heater 10.

The sensor layer 16 having a positive temperature coefficient is a component of a sensor device which, apart from the sensor layer 16, also comprises a measuring device 18 and a controller 20 which does not have to be exclusively allocated to the sensor device. For example, it is feasible that the controller 20 controls or regulates the operation of the entire vehicle heater, or that the functions essential for the sensor device are performed by a controller 20 which is present in the vehicle anyway. During the operation of the vehicle heater 10 the measuring device 18 monitors the temperature-dependent resistor of the sensor layer 16, for example by applying a preferably constant voltage to the end sections of the sensor layer 16 as indicated by the broken lines—and detects the resulting current flow, for example via a shunt resistance which may be a component of the measuring device 18. Now, if excessive heating, for example to a temperature of more than 150° C., occurs in the area of the heat conductor layer 14 due to any defect this will, in case of a suitable conditioning of the sensor layer 16 result in that its overall resistance will increase due to its series connection character dominating in case of a positive temperature coefficient so that this can be reliably detected by the measuring device 18. The measuring device 18 may then supply a suitable signal to the controller 20 so that it, as a counter measure, for example, reduces or completely prevents the current flow through the heat conductor layer 14.

Figure 2:
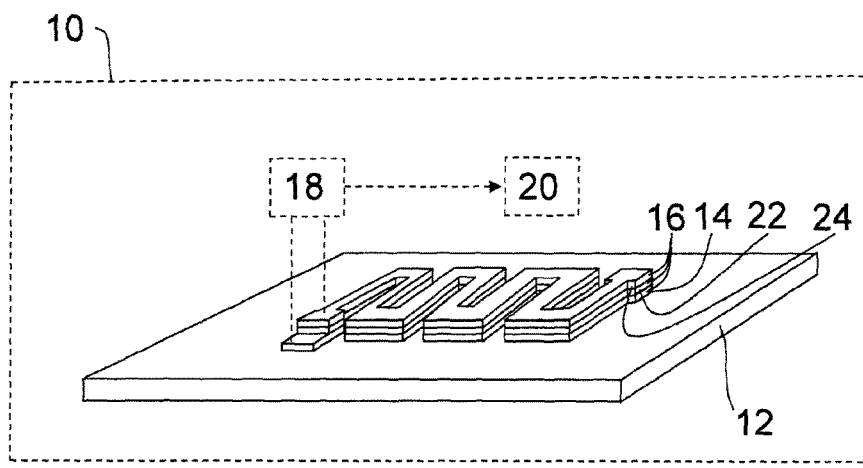
FIG. 2 shows a schematic, partly perspective representation of a second embodiment of a vehicle heater which, at the same time, illustrates process steps for producing this vehicle heater.

FIG. 2 shows a schematic, partly perspective representation of a second embodiment of a vehicle heater 10, and it illustrates, at the same time, process steps for producing this vehicle heater 10.

In this embodiment the heat conductor layer 14 is also sprayed directly onto the main body of the vehicle heater 10 formed by a heat exchanger 12. The vehicle heater according to FIG. 2 differs from the vehicle heater according to FIG. 1 in that the sensor layer 16 comprises three components in this embodiment, namely the heat conductor layer 14 which, in this case, apart from its actual function as a heating conductor, at the same time forms a component of the sensor layer 16, a layer 22 sprayed onto the heat conductor layer 14 by thermal spraying and having a negative temperature coefficient and an electrically conductive contact layer 24 applied to the layer 22. The mode of operation of this structure is as follows: If, due to any defect, excessive heating occurs in the area of the heat conductor layer 14, for example a temperature of more than 150° C., this will, in case of a suitable conditioning of the layer 22 having a negative temperature coefficient, result in that its overall resistance or its overall impedance will decrease due to its parallel circuit character dominating in case of a negative temperature coefficient so that this can be reliably detected by the measuring device 18. To this end, the measuring device 18 is, in this case, connected between the heat conductor layer 14 additionally serving as a lower contact layer and the contact layer 24 provided above the layer 22 having a negative temperature coefficient as indicated by the broken lines. In this way, the measuring device 18 can, in a similar way as explained in connection with the embodiment according to FIG. 1, reliably detect a local or general exceedance of a temperature threshold value based on a clear decrease of the resistance or of the impedance of the layer 22 having the negative temperature coefficient, and supply a corresponding signal to the controller 20.

Figure 3:
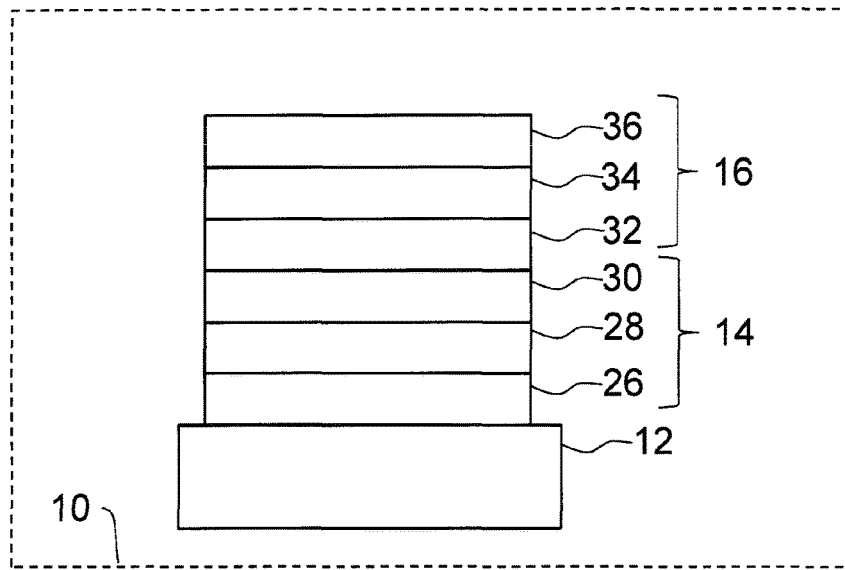
FIG. 3 shows a schematic, partly cut representation of a third embodiment of a vehicle heater which, at the same time, illustrates process steps for producing this vehicle heater.

FIG. 3 shows a schematic, partly cut representation of a third embodiment of a vehicle heater 10, and it illustrates, at the same time, process steps for producing this vehicle heater 10.

In the vehicle heater 10 schematically shown in FIG. 3 the main body 12 is also formed by a heat exchanger. In this case, however, the heat exchanger 12 is made of an electrically conductive material, particularly of aluminium. Therefore, the heat conductor layer 14 is subdivided into in a first insulation layer 26, the actual heating layer 28, and a second insulation layer 30 in this embodiment. Preferably all three components of the heat conductor layer are sprayed on using a thermal spraying method. With regard to the illustration above the heat conductor layer altogether designated by 14 a sensor layer altogether designated by 16 is provided which was also sprayed on using a thermal spraying method and which, in this embodiment, also comprises three components. Directly above the second insulation layer 30 there is a first electrically conductive contact layer 32 onto which a layer 34 of a material having a negative temperature coefficient was sprayed. The layer 34 may—without being limited thereto—particularly consist of one of the materials suggested for layers having a negative temperature coefficient in the general part of the description. Directly onto the layer 34 having a negative temperature coefficient a second electrically conductive contact layer 36 was sprayed. The layer 34 having a negative temperature coefficient is conditioned so that even a local exceedance of a predetermined temperature threshold value in any area of the heat conductor layer 14 will result in that the overall resistance or the overall impedance of the layer 34 having the negative temperature coefficient effective between the first contact layer 32 and the second contact layer 34 clearly decreases due to the parallel circuit character of the structure. This can be reliably detected by a measuring device connected, analogous to FIG. 2, between the contact layers 32 and 36, but not shown in FIG. 3, so that suitable countermeasures can be taken.

Figure 4:
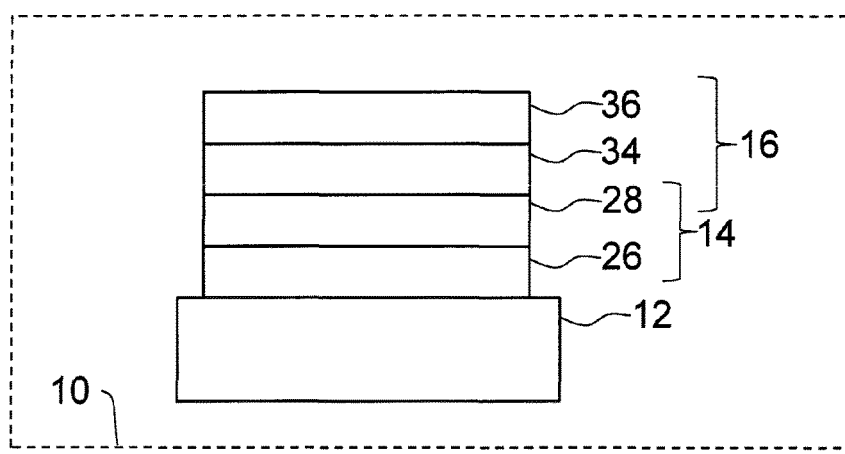
FIG. 4 shows a schematic, partly cut representation of a fourth embodiment of a vehicle heater which, at the same time, illustrates process steps for producing this vehicle heater.

FIG. 4 shows a schematic, partly cut representation of a fourth embodiment of a vehicle heater 10, and it illustrates, at the same time, process steps for producing this vehicle heater 10.

The vehicle heater 10 shown in FIG. 4 differs from the vehicle heater according to FIG. 3 in that the second insulation layer 30 and the first contact layer 32 were omitted here. In the embodiment shown in FIG. 4 the heat conductor layer 14 therefore only comprises the lower, first insulation layer 26 and the actual heating layer 28. The actual heating layer 28 assumes a double function here because it, apart from the heating function, also serves as a lower contact layer of the sensor layer altogether designated by 16. The sensor layer 16 therefore includes the actual heating layer 28, the layer 34 having the negative temperature coefficient and the upper contact layer 36 in this case. The measuring device not shown in FIG. 4 neither is therefore to be connected between the actual heating layer 28 and the upper contact layer 36 to obtain the functionality described with reference to FIG. 3.

Even though this is not shown in the Figures it should be clear that providing an insulation layer between the main body 12 and the heat conductor layer 16 and/or between the heat conductor layer 14 or its actual heating layer and the sensor layer 16 may also be advantageous in case of the use of sensor layers having a positive temperature coefficient. In addition, a topmost cover layer (not shown) may be provided in all cases, particularly an insulating topmost cover layer which preferably assumes a protective function.

The abovementioned insulating layers 26 and 30 may, for example, be aluminium oxide layers, while the heat conductor layer 14 or the actual heating layer 28 may, for example, be realised by a nickel chromium layer. As contact layers 32, 36, for example, copper layers may be used, and as the layer 34 having the negative temperature coefficient, apart from the materials already mentioned in the general part of the description, for example, also a layer of titanium oxide doped with chromium oxide is contemplable.

The features of the invention disclosed in the above description, in the drawings as well as in the claims may be important for the realisation of the invention both individually and in any combination.

LIST OF NUMERALS

10 vehicle heater
12 main body/heat exchanger
14 heat conductor layer
16 sensor layer
18 measuring device
20 controller
22 layer having a negative temperature coefficient
24 contact layer
26 first insulation layer
28 actual heating layer
30 second insulation layer
32 first contact layer
34 material having a negative temperature coefficient
36 second contact layer

The invention claimed is:

1. A method for producing a vehicle heater including a main body equipped with a non-intrinsically safe heat conductor layer, and a sensor device for detecting exceedances of a temperature threshold value, said method comprising:
    spraying a sensor layer onto a heat conductor layer of a main body of a vehicle heater forming a sensor device;
    fixing said sensor layer onto the main body without exposing the main body to temperatures common in baking processes;
    wherein the main body is at least one of a metal/air and a metal/liquid heat exchanger.

2. The method according to claim 1, in which the sensor layer and/or the heat conductor layer is/are formed using a thermal spraying method.

3. The method according to claim 1, in which the main body is only exposed to temperatures of less than 800° C. when fixing the sensor layer onto the main body.

4. The method according to claim 1, in which the sensor layer has a layer thickness in the range of 10 μm to 200 μm.

5. The method according to claim 1, in which the sensor layer is sprayed, at least in part, in the form of a powder, wherein powder particles of the powder are present in an agglomerated form or are brought in an agglomerated form, and wherein the non-agglomerated powder particles have an average grain size d50 of less than 20 μm.

6. The method according to claim 1, in which the sensor layer is sprayed, at least in part, in the form of a powder providing the sensor layer with a resistance or impedance characteristic with a positive temperature coefficient.

7. The method according to claim 1, in which the sensor layer is sprayed, at least in part, in the form of a powder providing the sensor layer with to a resistance or impedance characteristic with a negative temperature coefficient.

8. A vehicle heater for the production of which the method according to claim 1 was used.

9. The method according to claim 1, in which the sensor layer is arranged on the heat conductor layer.

10. The method according to claim 1, in which the sensor layer is arranged on the main body's side facing away from the heat conductor layer.

11. The method according to claim 1, in which the main body consists at least partially of aluminum.

\* \* \* \* \*